J. F. CONKLIN.
REMOVABLE SAW TOOTH FOR METAL CUTTING SAWS.
APPLICATION FILED SEPT. 13, 1911.
1,046,737.
Patented Dec. 10, 1912.
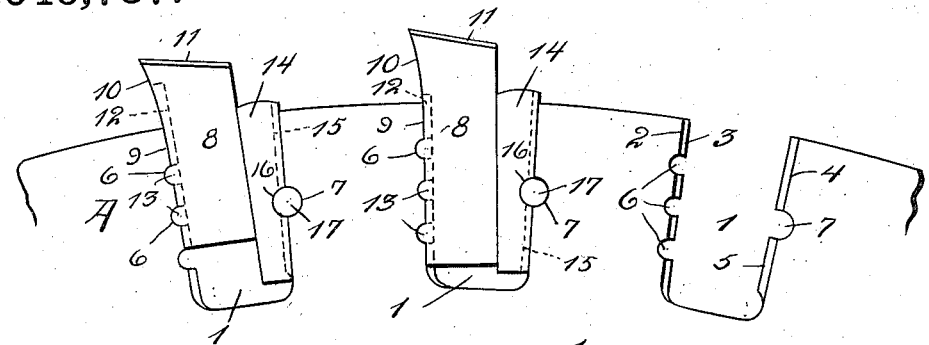
Fig. 1.
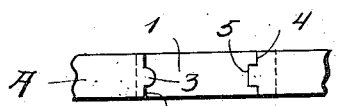
Fig. 2.
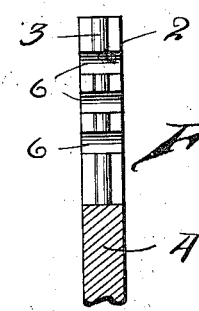
Fig. 3.
Fig. 5.
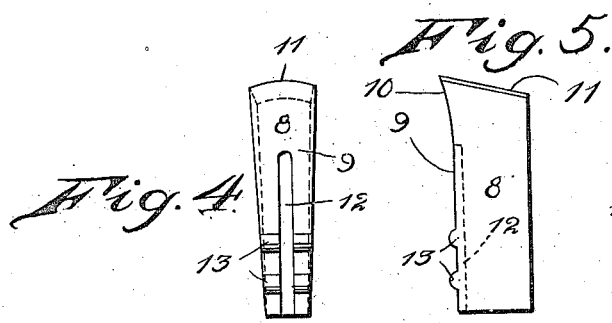
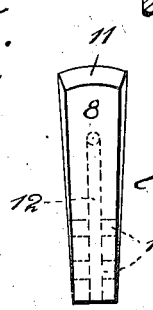
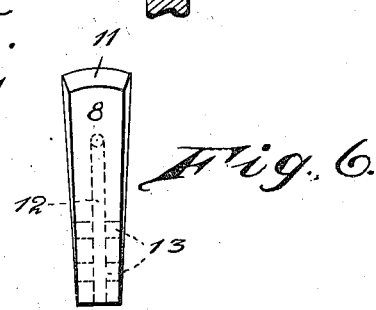
Fig. 4.
Fig. 6.
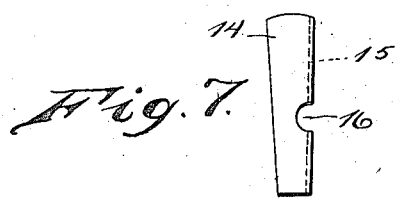
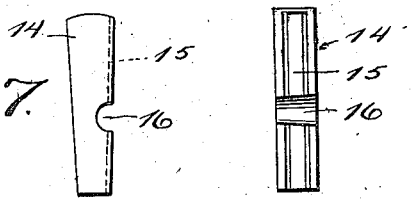
Fig. 9.
Fig. 7.
Fig. 10.
Fig. 8.
Witnesses
J. Milton Jester.
T. Randolph Jr.
Inventor
John F. Conklin
By D. A. Gourick
Attorney

UNITED STATES PATENT OFFICE.

JOHN F. CONKLIN, OF SOUTH BETHLEHEM, PENNSYLVANIA.

REMOVABLE SAW-TOOTH FOR METAL-CUTTING SAWS.

1,046,737. Specification of Letters Patent. Patented Dec. 10, 1912.

Application filed September 13, 1911. Serial No. 649,144.

*To all whom it may concern:*

Be it known that I, JOHN F. CONKLIN, a citizen of the United States, residing at South Bethlehem, in the county of Northampton and State of Pennsylvania, have invented certain new and useful Improvements in Removable Saw-Teeth for Metal-Cutting Saws, of which the following is a specification.

My invention relates to saws for cutting metal and has for its object the provision of a saw having removable teeth of a novel construction and provided with novel means for securing them in position.

My invention will be described in detail hereinafter and illustrated in the accompanying drawings in which—

Figure 1 is a side view of a fragment of a circular saw blade showing my improved teeth in position, one tooth being shown as it is placed originally, another tooth being shown as it is placed after being worn, and one of the sockets in the blade being shown empty. Fig. 2, a top plan view of one of the sockets, Fig. 3, is a sectional detail of a fragment of the blade taken through an empty socket. Figs. 4, 5 and 6, front, side and rear views respectively of one of the removable teeth. Figs. 7, 8 and 9, side, rear and end views, respectively, of the wedge key, and Fig. 10, a detail view of the key pin.

In the drawings similar reference characters will be used to designate corresponding parts in the several views.

The circular blade A of my improved saw is provided, around its edge, with sockets 1 having their side walls formed radially of the blade. The front side walls 2 are each formed with a central longitudinal bead or rib 3, while the rear side walls 4 are each formed with a bead or rib 5, bead or rib 3 being preferably circular in cross section, while the bead or rib 5 is rectangular. Front wall 2 is formed with a series of transverse notches 6, while the rear wall 4 is provided with a single notch 7 that is, as shown, a segment of a circle.

Each of my removable saw teeth, designated 8, is formed with parallel sides for the major portion of its length, and with one of its sides, designated 9, outwardly flaring, as shown at 10, to form the cutting points, while its outer end 11 is formed curved laterally and inclined rearwardly. The front side 9 is likewise formed with a central longitudinal groove 12 through a portion of its length to engage bead 3, and with transverse lugs or projections 13 that engage the notches 6 when the tooth is in position and prevent it from pulling out. In the drawings I have shown notches 6 to be three in number, and the lugs 13 to be only two in number, this structure providing for adjusting the tooth outwardly as its cutting point is worn down, one of the teeth in Fig. 1 being shown in the position assumed when first placed in the saw, while the other tooth is shown in the position assumed when the cutting point has been worn down slightly.

14 indicates a wedge key that is formed tapering as shown with one side adapted to engage the tooth 8 and its other side formed with a longitudinal groove 15 shaped to engage the bead 5 and having a transverse notch 16 that is a segment of a circle and when in position and registering with notch 7 forms a complete circle for the reception of my improved locking pin 17. Said locking pin 17 consists of a tapered plug formed with a transverse slot 18 in its smaller end, and is secured in position by insertion in the hole formed by the registered notches 7 and 16 and held therein by spreading the parts of the plug on each side of the slot with any suitable tool or implement until they engage the sides of the hole formed by notches 7 and 16. To remove the locking pin 17 it is necessary only to drive it outwardly from the smaller end with any suitably constructed tool or implement.

Having thus described my invention what I claim is—

In combination with a circular saw blade formed with sockets having radial side walls, longitudinal beads or ribs and transverse notches in said side walls, a tooth adapted to removably engage each socket having parallel sides throughout the major portion of its length, one of said sides having a longitudinal groove therein, transverse lugs or projections on the grooved side of the tooth and adapted to engage the notches in one of the walls of the socket, a wedge shaped key adapted to engage the other side of the tooth and the remaining wall of the socket, the side of the key engaging the socket wall being longitudinally grooved to engage the bead or rib thereon and formed with a notch adapted to register with the notch in the socket wall, and a split pin adapted to engage the hole formed by said registered notches.

In testimony whereof I hereto affix my signature in the presence of two witnesses.

JOHN F. CONKLIN.

Witnesses:
F. P. McGovern,
Quintus E. Snyder.